United States Patent Office 2,837,529
Patented June 3, 1958

2,837,529
SUBSTITUTED THIAZOLIDONES AND THEIR PREPARATION

Stanley O. Winthrop, Montreal, Quebec, Canada, assignor to American Home Products Corporation, New York, N. Y., a corporation of Delaware No Drawing. Application May 2, 1957
Serial No. 656,517

9 Claims. (Cl. 260—306.7)

This invention relates to new substituted thiazolidones and their preparation.

More particularly, this invention relates to novel 2-benzhydrylimino-5-lower alkyl-4-thiazolidones, and to the process by which they may be prepared. The new compounds are valuable in medicine, possessing activity as depressants for the central nervous system and for other purposes.

The new chemical compounds with which this invention is concerned may be represented by the following formula:

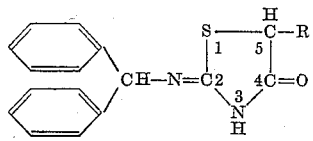

where R is lower alkyl.

Since the salts of these compounds, particularly the acid addition salts thereof, possess similar pharmacological activity, these salts may be used in place of the base form of the compounds as indicated by the formula.

In preparing the new chemical compounds, N-benzhydrylthiourea is condensed with an ester of an α-halogen-substituted aliphatic carboxylic acid of the structure

where R' and R" are lower alkyl and X is a halogen. The lower alkyl esters of the α-bromocarboxylic acids are especially useful in this process.

When the reactants are brought together in the approximate ratio of one mole of the N-benzhydrylthiourea to one and one-half moles of the ester in a solvent such as glacial acetic acid and heated under reflux conditions, the condensation takes place without difficulty. The resulting 2-benzhydrylimino-5-lower alkyl-4-thiazolidone may be recovered in a substantially pure state from the reaction mixture.

*Example 1.—2 - benzhydrylimino-5-ethyl-4-thiazolidone*

7.26 grams (0.03 mole) of N-benzhydrylthiourea and 9.0 grams (0.045 mole) of ethyl-α-bromobutyrate were dissolved in 50 millilitres of glacial acetic acid and heated under reflux for 8 hours. The reaction mixture was then allowed to cool. Upon the addition of water thereto, 7.5 grams of 2-benzhydrylimino-5-ethyl-4-thiazolidone precipitated out and was recovered.

The product was subjected to two recrystallizations from an ethanol solution, and the substantially pure product was thereby secured. A representative sample of the pure compound melted at 215–216° C.

Calculated for $C_{18}H_{18}N_2OS$: C, 69.65; H, 5.85; N, 9.03; S, 10.33. Found: C, 69.81; H, 5.74; N, 8.93; S, 10.23.

*Example 2.—2 - benzhydrylimino-5-methyl-4-thiazolidone*

This compound was prepared from N-benzhydrylthiourea and ethyl-α-bromopropionate following the procedure and utilizing the relative amounts of each reactant as described in Example 1. Upon recrystallization twice from an ethanol solution, substantially pure 2-benzhydrylimino-5-methyl-4-thiazolidone was obtained and its structure confirmed by analysis. A representative sample of the product melted at 245–246° C.

*Example 3.—2 - benzhydrylimino-5-n-butyl-4-thiazolidone*

By reacting N-benzhydrylthiourea and ethyl-α-bromo-n-caproate in accordance with the procedure described in Example 1, 2-benzhydrylimino-5-n-butyl-4-thiazolidone was obtained. Recrystallization twice from ethanol solution gave a substantially pure product, a representative sample of which melted at 196–197° C. Elemental analysis confirmed the structure.

The above description and examples are intended to be illustrative only. Modifications thereof, as well as variations therefrom, are intended to be included within the scope of the appended claims.

I claim:

1. A compound of the formula

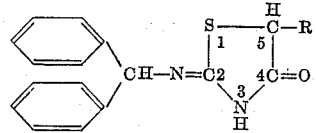

where R is lower alkyl.
2. 2-benzhydrylimino-5-methyl-4-thiazolidone.
3. 2-benzhydrylimino-5-ethyl-4-thiazolidone.
4. 2-benzhydrylimino-5-n-butyl-4-thiazolidone.
5. The process of preparing 2-benzhydrylimino-5-monoalkyl-4-thiazolidones which comprises condensing N-benzhydrylthiourea and an ester of an α-halocarboxylic acid of the formula

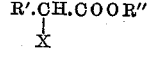

where R' and R" are lower alkyl and X is halogen.
6. The process of preparing 2-benzhydrylimino-5-monoalkyl-4-thiazolidones which comprises bringing into mutual contact in an inert solvent at an elevated temperature N-benzhydrylthiourea and an ester of an α-bromocarboxylic acid of the formula

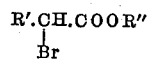

where R' and R" are lower alkyl.
7. The process of preparing 2 - benzhydrylimino - 5-methyl-4-thiazolidone which comprises reacting N-benzhydrylthiourea and ethyl-α-bromopropionate in glacial acetic acid at an elevated temperature.
8. The process of preparing 2-benzhydrylimino-5-ethyl-4-thiazolidone which comprises reacting N-benzhydrylthiourea and ethyl-α-bromobutyrate in glacial acetic acid at an elevated temperature.
9. The process of preparing 2-benzhydrylimino-5-n-butyl-4-thiazolidone which comprises reacting N-benzhydrylthiourea and ethyl-α-bromo-n-caproate in glacial acetic acid at an elevated temperature.

No references cited.